(12) United States Patent
Tarres Bolos

(10) Patent No.: US 9,497,334 B2
(45) Date of Patent: Nov. 15, 2016

(54) IMAGE MODULE FOR A PHOTO BOOTH

(75) Inventor: Josep Tarres Bolos, Sant Fruitos de Bages (ES)

(73) Assignee: DIGITAL CENTRE, S.L., Barcelona (ES)

(*) Notice: Subject to any disclaimer, the term of this patent is extended or adjusted under 35 U.S.C. 154(b) by 2 days.

(21) Appl. No.: 14/354,747

(22) PCT Filed: Oct. 28, 2011

(86) PCT No.: PCT/ES2011/070750
§ 371 (c)(1),
(2), (4) Date: Aug. 14, 2014

(87) PCT Pub. No.: WO2013/060906
PCT Pub. Date: May 2, 2013

(65) Prior Publication Data
US 2014/0362237 A1  Dec. 11, 2014

(51) Int. Cl.
*H04N 1/00* (2006.01)
*G03B 17/53* (2006.01)

(52) U.S. Cl.
CPC .......... *H04N 1/00132* (2013.01); *G03B 17/53* (2013.01)

(58) Field of Classification Search
CPC ... H04N 7/183; H04N 1/00132; G03B 17/53
USPC .......................................... 348/158, 143, 61
See application file for complete search history.

(56) References Cited

U.S. PATENT DOCUMENTS

| | | | | |
|---|---|---|---|---|
| 6,298,197 B1 * | 10/2001 | Wain | ...................... | G03B 17/53 348/61 |
| 6,809,757 B1 * | 10/2004 | Ito | .......................... | G07F 17/02 348/143 |
| 2011/0234779 A1 * | 9/2011 | Weisberg | .............. | G03B 17/53 348/61 |
| 2013/0080222 A1 * | 3/2013 | Quinn | .................... | G06Q 30/02 705/14.5 |

* cited by examiner

Primary Examiner — James Hannett

(57) ABSTRACT

The invention relates to a photo booth, among others, preferably for rentals and commercial promotions, which is intuitively used by the user, improves handling, connectivity, transport and the services offered and is formed by means of an image module with four multifunctional image areas which, in the working position, are aligned, allowing work to be carried out on each of said areas like work on the actual strip of photographs from a photo booth, from which four photos emerge.

12 Claims, 3 Drawing Sheets

IMAGE MODULE FOR A PHOTO BOOTH

OBJECT OF THE INVENTION

More specifically the invention refers to a photo booth which is made up of an image module with four image areas; in operating position these four images are aligned, said module being inspired by the product of strips of photos from a photo booth, in which there are four photos, said image module being included as part of a photo booth, or making up one itself independently.

STATE OF THE ART

There are several types of photo booths on the market, which can therefore be considered as state of the art, basically consisting of a booth, generally with a prismatic shape, which is accessed from a larger side base. Inside there is a seat, perpendicular to one of the smaller vertical side bases, and opposite this there is a camera, and in some cases a screen. In the lower part of the booth and under the screen and a desk of controls, there are the necessary electronic devices, among them a photo printer and the corresponding PC, so that the user can touch up the corresponding photos from inside the booth, with the aid of a keyboard and said screen.

There are not photo booths that have a system of four image areas, whose functions are independent for each of them, and which also allow a representation of the photographic strip that is going to be obtained. There are also not photo booths without a booth, that is to say, where the user stays totally outside and the machine is easy to move, also allowing communication between more than one such machine.

PURPOSE OF THE INVENTION

Being able to have a photo booth that as a novel product is preferentially aimed at rentals and commercial promotions, among other things, which users can use intuitively, improving the handling and services offered, using four multifunctional image areas that allow work on each of them as work on the photographic strip itself.

Another object of the present invention is having means to connect to other photo booths of the kind already known, or new designs that foresee connection, also between various photo booths like the ones claimed herein, as well as having means to improve upon their transport and storage.

DESCRIPTION OF THE INVENTION

The proposed invention has the form of an image module for a photo booth made up of a panel with four multifunctional image areas, including photographic devices on the same side that has image areas that can record a video or be used as a webcam. This module includes a means to connect it to other modules identical to it, as well as connecting to other photo booths or transportable structures of said module. There are also physical communication means or to networks with peripheral elements that allow the obtaining, reproduction, or distribution of the photographs obtained, as well as a computer that manages the applications, services and configuration of the module and the means to print the photographs.

Alternatively, for small modules, there are means to connect to the usual elements like the computer that manages the applications, services and configuration of the module from the outside, as well as the means to print the photographs.

The image module for photo booths advantageously contains four multifunctional image areas, allowing different operations to be performed on each of the areas simultaneously, so that that it is much more intuitive for the user, who can easily identify it with the product obtained, which is the photographic strip, and because it also allows different types of simultaneous information that can be consulted by users of the machine, so that they can personalize the product.

These image areas are usually made up of four screens, of which at least one has touch technology, allowing the user access to the module's services and applications, and to the rest of the screens. Alternatively, all of the screens can be touch screens, or made up of said module, with at least one touch screen that is large enough to allow it to be virtually or physically divided into the four areas necessary to allow more intuitive, comfortable use and a wider variety of functions for the user.

Among the functions that each of the image areas can perform jointly, or each one of them differently, are:

Showing each one of the photos that the user takes, whether using the photographic devices the module has, or those located inside the usual photo booth that it is connected to.

Showing the instructions for use, recommendations, and services available.

Showing a history of photos of this same user, or of previous ones, or of a specific subject, which the user can personalize.

Showing commercial-advertising services.

Showing information about the use of the applications, execution time, possibilities of exporting the image, etc.

Handling and managing the photo booth applications.

Accessing social networks or websites to add images to the module or to export images obtained in it.

Accessing peripheral devices to export and import images.

The communication means of the image module allow connection physically by way of ports of different applications, or wireless, with elements allowing the obtaining of images, their printing or reproduction, storage, importation or exportation, and the management of the applications containing the image module for the photo booth.

The versatility of said module has the advantage of allowing it to be used by the user in a variety of configurations, as it can be used as an independent photo booth module being open to the outside without a covering structure, as an outside element of a conventional photo booth, linked to a structure that provides only the printing and/or means of transportation, or as a group of modules to have a set of screens and cameras, single and coordinated, like a gigantic screen. As well as being able to be connected with peripheral elements, it can also remain connected to computers, all formats of printers, all formats of projectors and screens and to the rest of the equipment necessary for obtaining, editing, exporting, importing, as well as printing and looking at images and videos.

This great versatility is because said image module brings together the basic characteristics of the photo booth, so it can act as an independent element. Besides this, as it has connection means like those indicated, for peripheral structures or elements, for other types of photo booth or for the same type of them, in can also be used in combination with them.

As an increase in the applicability of the invention, there can be a typical photo booth module with four areas of vertical images lined up, joined and connected functionally to a structure that allows the user to move it, usually with wheels, and to incorporate the printing means and the computer that manages said module.

The photo booth module incorporates one or more articulated transversal divisions of the same, allowing the module to be folded, reducing the size of the whole, and making transport easier for the user. When it is time to use it, the module can be unfolded again, fixed and stabilized by the means included to hold its position of four vertically aligned image areas, and used in any of the options and applications indicated.

Other details and characteristics shall be shown throughout the description below referring to drawings attached to this report which are shown for illustrative but not limiting purposes only in a drawing of the invention.

Below is a list of numbers that are found on the diagrams and which identify the different parts and components of the invention: (10) image module for a photo booth, (11) screens, (12) photographic equipment, (13) means for fixing the position, (14) system for collapsing the module (10), (15) transport structure, (16) handle for transport, (17) wheels for transport, (18) extendable photo booth, (19) side wall of the extendable photo booth (18), (20) connection means to the structure (15) or to the photo booth (18), (21) means to stabilize the structure.

DESCRIPTION OF AN EMBODIMENT OF THE INVENTION

Figure 1:
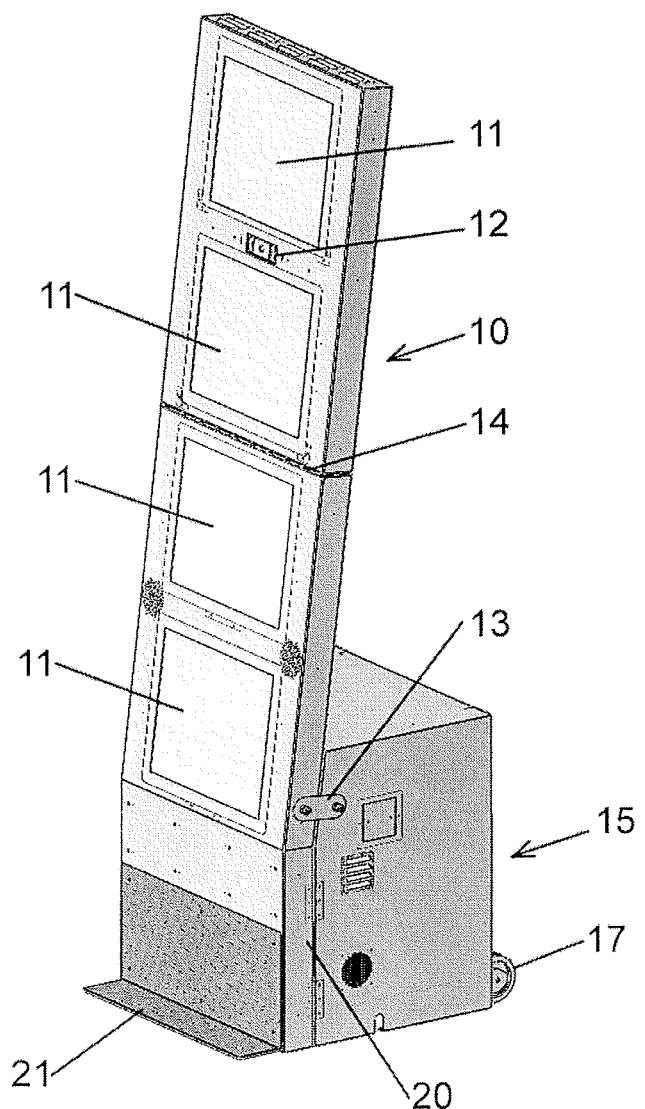
FIG. 1 is a view of a preferred embodiment in which the photo booth module is collapsible and is seen joined to a portable structure, in its unfolded state.
Figure 2:
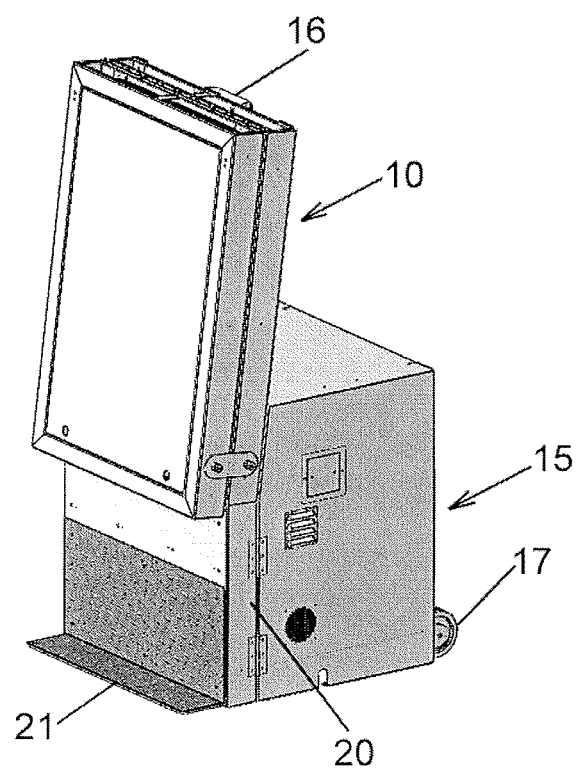
FIG. 2 is a view of a preferred embodiment in which the photo booth module is collapsible and is seen joined to a portable structure, in its folded-down state.
Figure 3:
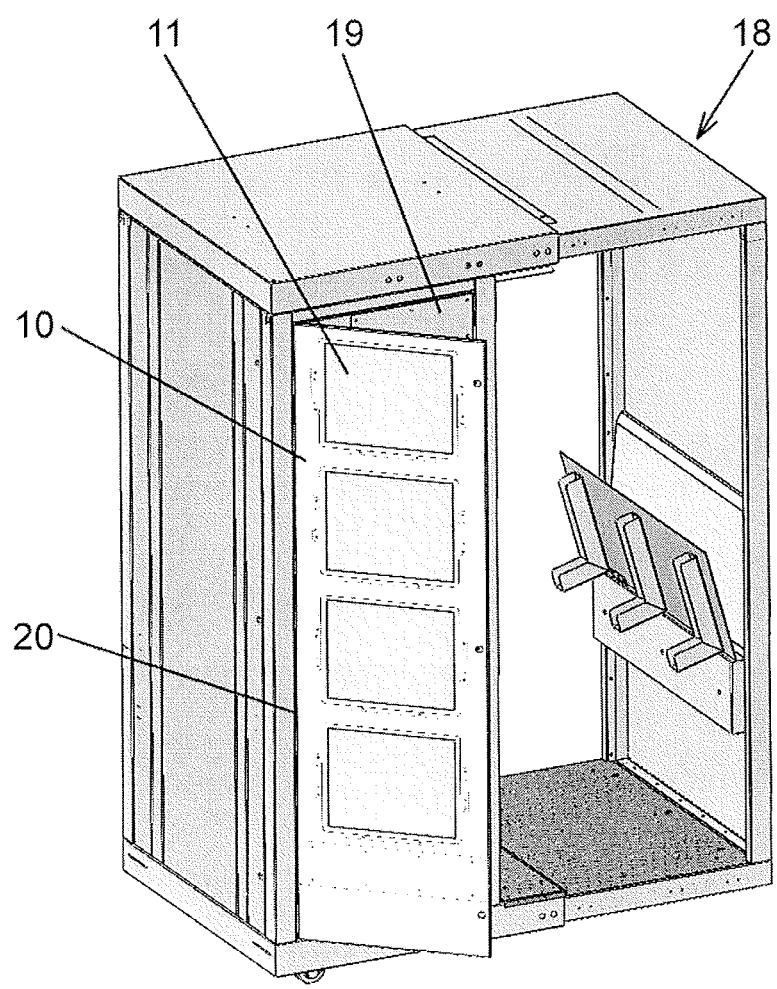
FIG. 3 is a view of a preferred embodiment in which the photo booth module is joined to the outer wall of an extendable photo booth and is joined to a portable structure, in its folded-down state.

In one of the preferred embodiments of the invention, and as can be seen in FIGS. 1 and 2, the image module for the photo booth (10) is connected to a transport structure (15), using a connection means (20) to the structure (15), which includes the printing means and a computer inside it, connected to the module (10), said module (10) being open to the outside with no structure covering it. The connection means (20) to the structure (15) in this embodiment consists of panels or profiles with quick-releasing hinges, allowing it to be connected easily.

The image module (10) is made up, in one of the preferred embodiments, of four touch screens (11) that are vertically aligned, with photographic equipment incorporated at an average height corresponding to the height of the user's head, preferably between the two upper screens (11), so that the photographic equipment (12) can capture the images as photographs, videos or as a webcam. Said photographic equipment (12) can be rotated to adjust the direction of the lens to the user's height.

The screens (11) provide the user with the possibility of choosing the services, sampling them, a manual for using them, modifying photographs, looking at the photographic strip locating a photo on each screen (12), the credit available, access to the import-export of images from peripheral means or through the network, views of personalized images from files, images and interactive publicity, etc.

The image module for a photo booth (10) has a folding system (14) consisting of a transversal division of the module (10) that separates it in two halves (10.1, 10.2), the upper one (10.1) folding down onto the lower one (10.2), protecting the screens (11). This position can be fixed using means (13) like a flap that holds the two halves (10.1, 10.2) together. To create a folded whole that is easy to transport, some wheels (17) have been placed on the structure (15), with a handle (16) on the back of the module (10), allowing the whole arrangement to be pulled. Once moved, the structure has means (21) to stabilize the whole, based on support panels.

This photo booth module (10) has communication means with peripheral elements such as the computer and printing means, as well as with other modules (10) that it provides in its connection as a gigantic screen. There is also an outlet to peripherals like projectors or screens of all sorts of formats, for third parties to be able to look at images.

In another of the preferred embodiments of the invention, the photo booth (10) image module is connected to an extendable photo booth (18), where on its side wall (19) it is connected by the connection means (20), remaining outside of it, and giving the photo booth (18) greater functionalism, as all of the functions of the module (10) are added to those of a conventional photo booth.

The connection between the image module for a photo booth (10) and the extendable photo booth (18) is structural and operational, as the image module for a photo booth (10) will use the photos taken on the inside of the extendable photo booth (18); it will allow the users inside to be seen outside, and it will use the printing, connecting with the computer of the photo booth (18), in addition to performing the usual operations of the image module for a photo booth (10).

Having sufficiently described this invention using the Figures attached, it is easy to understand that any changes judged to be suitable may be made, whenever these changes do not alter of the essence of the invention summarised in the following claims.

The invention claimed is:

1. An image module for a photo booth comprising electronic means including a computer with photographic applications, a photographic equipment, wherein the image module for a photo booth is made up of a panel of multifunctional aligned image areas, forming an independent photo booth module, without an external structure that covers the panel, in that at least one of the image areas communicates with the computer and photographic equipment, a printing means, and other functional components that are added to the module, wherein each image area can execute an independent functionality, with means for connecting to fixed structures, mobile structures or photo booths wherein said panel is further defined as having four image areas, at least one of the four image areas has a touch screen, the touch screen being capable of:

showing each one of the photos that the user takes, whether using the photographic devices the module has, or those located inside the usual photo booth that it is connected to;

showing the instructions for use, recommendations, and services available;

showing a history of photos of this same user, or of previous ones, or of a specific subject, which the user can personalize;

showing commercial-advertising services;

showing information about the use of the applications, execution time, possibilities of exporting the image, etc;

handling and managing the photo booth applications;

accessing social networks or websites to add images to the module or to export images or videos obtained in it; and accessing peripheral devices to export and import images.

2. An image module for a photo booth according to claim 1 characterized in that the aligned image areas are four.

3. An image module for a photo booth according to claim 1 characterized in that the image module has connection means to peripheral systems of computers, storage, reproduction and printing, with communication means to applications and sites on a telematic network, and with connection means between other photo booth modules.

4. An image module for a photo booth according to claim 1 characterized in that the four image areas are made up of four screens.

5. An image module for a photo booth according to claim 2 characterized in that the four image areas are made up of at least one screen with divisions that make up the four aforementioned image areas.

6. An image module for a photo booth according to claim 1 characterized in that the computer and printing devices are included inside of the module.

7. An image module for a photo booth according to claim 1 characterized in that a communication means with peripheral systems, conventional photo booths, and between identical photo booth modules consist of physical connection ports, as well as wireless communication.

8. An image module for a photo booth according to claim 1 characterized in that the photographic equipment is installed in the photo booth module, on the same side of at least one screen, with means of rotating said photographic equipment, and having video recording and webcam modes.

9. An image module for a photo booth according to claim 1 characterized in that a means for connecting it to transport structures and conventional photo booths is made up of a system of panels with hinges on the structure to be attached to.

10. An image module for a photo booth comprising electronic means including a computer with photographic applications, a photographic equipment, wherein the image module for a photo booth is made up of a panel of multi-functional aligned image areas, forming an independent photo booth module, without an external structure that covers the panel, in that at least one of the image areas communicates with the computer and photographic equipment, a printing means, and other functional components that are added to the module, wherein each image area can execute an independent functionality, with means for connecting to fixed structures, mobile structures or photo booths in that the photo booth module includes at least one articulated transversal folding division that separates the image module into two halves allowing the module to be folded and a means for fixing the folded position, as well as a handle for it to be transported in the folded position.

11. An image module for a photo booth according to claim 9 characterized in that the transport structure where the photo booth module is connected has a joint for the connection means of the module, computer and printing equipment to connect the module, a system of wheels for transport, and a means to stabilize the whole.

12. An image module for a photo booth according to claim 10 characterized in that the aligned image areas are four.

* * * * *